Sept. 16, 1952          E. LATTA ET AL          2,611,116

PARKING CONTROL FOR WINDSHIELD WIPERS

Filed Jan. 6, 1950          2 SHEETS—SHEET 1

INVENTORS
EDWARD LATTA
ADOLPH J. WOLTANSKI
BY
Martin J. Finnegan
Attorney

Sept. 16, 1952     E. LATTA ET AL     2,611,116
PARKING CONTROL FOR WINDSHIELD WIPERS Filed Jan. 6, 1950     2 SHEETS—SHEET 2

INVENTORS
EDWARD LATTA
ADOLPH J. WOLTANSKI
BY
Martin J. Finnegan
ATTORNEY

Patented Sept. 16, 1952

2,611,116

UNITED STATES PATENT OFFICE 2,611,116

PARKING CONTROL FOR WINDSHIELD WIPERS

Edward Latta, Owosso, and Adolph J. Woltanski, Henderson, Mich., assignors to Redmond Company, Inc., Owosso, Mich., a corporation of Michigan Application January 6, 1950, Serial No. 137,204

3 Claims. (Cl. 318—275)

This invention relates to windshield wipers, and particularly to a wiper system utilizing an electric motor as the actuating force.

Where an electric motor is employed as the power means for driving a set of wiper blades across the two panels of a windshield, in opposite directions alternately, with the motor in continuous rotation in a single direction only, it is difficult to effect the stopping of the blades in the desired "parking" position, that is, the position in which each blade will rest snugly against the bottom edge of its respective windshield panel. The difficulty arises because of the inherent tendency of the motor to continue in rotation for a variable number of revolutions, following the cutting-off of power by the manual operation of the operator's control switch located adjacent the driver's position in the vehicle.

To attempt to insure such stopping of the blades in the correct positions, notwithstanding the position thereof when power is cut off the motor, prior systems have included various means, some mechanical and some electro-mechanical, for causing the motor to cease rotation upon establishment of registry between two elements, one rotating with the motor and one stationary, following operation of the manual cut-out switch. These two elements then function to apply mechanical braking force to the motor shaft or some element rotating with the motor shaft, to effect actual stopping of the motor.

The present invention provides a different solution to the parking problem, involving the introduction of a reverse magnetic field of predetermined capacity within the motor itself, following operation of the manual stopping switch, which reverse field operates to insure positive stopping of the motor with the blades at correct parking position.

The novel control means is illustrated in the three circuit diagrams constituting the drawings of this application, and representing one embodiment of the invention; but of course other arrangements of parts are possible within the scope of the invention as disclosed and claimed.

Figure 1:
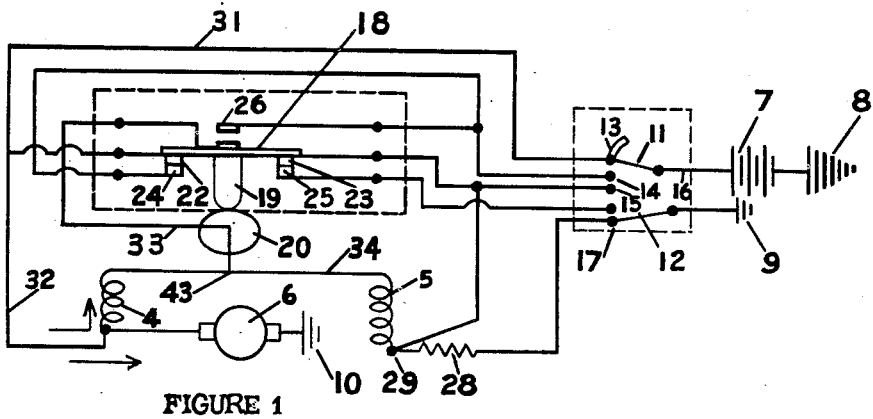
Figure 2:
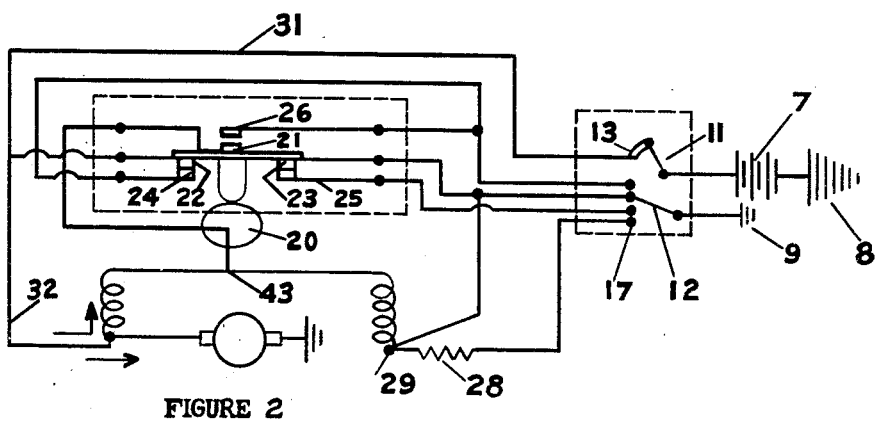
Figure 3:
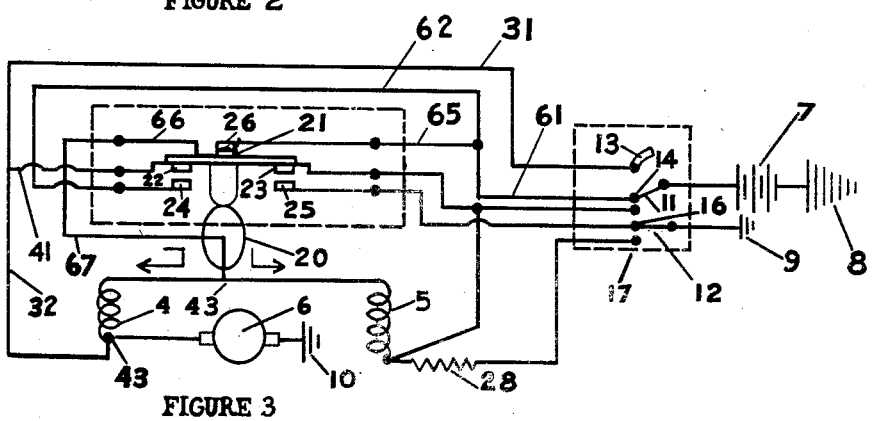
Figure 4:
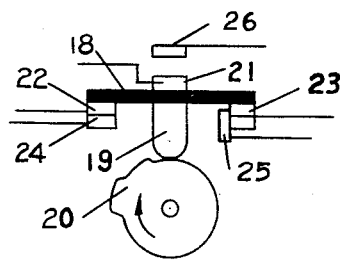
Figure 5:
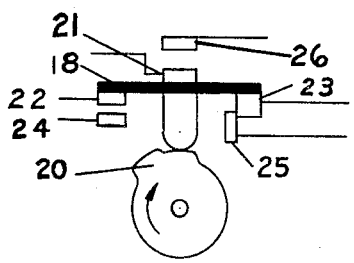
Figure 6:
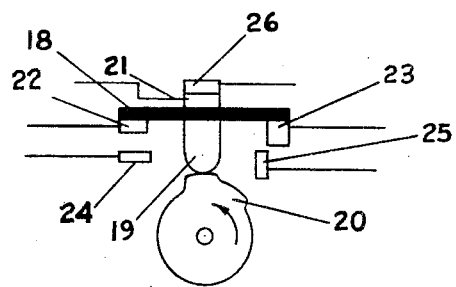

In the drawings, Figure 1 shows the electrical connections to the operating motor as they appear with the wipers in normal action at high speed; Figure 2 shows the circuits and parts as they appear with the wipers in action at lower speed; Figure 3 shows the circuits and parts as they appear just before the wiper blades are stopped in parked position; and Figures 4, 5 and 6 show positions successively assumed by the several components of the automatic switching mechanism, during the blade-parking operation.

In Figures 1, 2 and 3 the motor is represented as having the usual pair of field windings 4 and 5; but whereas it has heretofore been customary to employ two relatively low resistance windings in series relation to the windings 6 of the armature, the present invention varies this procedure in two respects: (1) by forming one coil (the coil 4, as illustrated) of relatively higher resistance, that is, a greater number of turns of smaller wire; and (2) by connecting both coils 4 and 5 so that they are normally in shunt relation to the armature, but with one of the coils being subject to reversal of the direction of current flow therein during the stopping operation. The purposes and results attained by these two deviations from normal motor construction and operation will be better understood as the description progresses. The source of current is indicated as the usual battery 7, and ground connections are indicated at 8, 9 and 10, for the battery, field windings and armature windings respectively.

The circuits from source 7 to the motor windings include double-pole switch blades 11 and 12, the former registrable with one of the terminal contacts 13, 14 and the latter with one of the contacts 15, 16, 17. Both blades move in unison to the Figure 1, Figure 2 or Figure 3 positions illustrated, in response to manual actuation of a switch handle or toggle, not shown. The motor circuits also include an automatic switch bar 18 (wholly or partly of non-conducting material) mounted on a cam follower 19 that shifts from an inner position (Figure 1 or 2) to an outer position (Figure 3) as the motor-operated cam 20 (illustrated schematically only in Figures 1, 2 and 3) reaches a position, once each revolution, wherein the follower 19 is urged outwardly by physical engagement of the cam therewith. It will be understood that cam 20 rotates at the speed of the low speed end of the gear reduction train (not shown) interposed between the motor and the rocker shafts carrying the wiper arms and blades.

Contacts 21, 22 and 23 are carried by switch bar 18, and cooperate with stationary contacts 26, 24 and 25, respectively, as shown. Conductors lead from manual switch terminals 13—16 to automatic switch contacts 21—26, as shown. A resistor 28 is inserted between switch terminal 17 and shunt field winding terminal 29, as a factor in the control of the speed of the motor.

To start the cycle the manual switch may be thrown to the "high speed" position illustrated in Figure 1. In this position switch blade 11 connects contact terminal 13 to the source 7, and switch blade 12 connects terminal 17 to ground 9.

With the switch blades in these respective positions a circuit is established for the flow of current to the windings 6 of the armature by way of conductors 31 and 32, the switch bar 18 not being included in the path of current flow during such operation. The circuit 31, 32 also leads to the field windings 4 and 5 by way of the shunt connection 34; and after passing through the field winding 5 the current finds its way to ground 9 by way of resistor 28, terminal 17 and switch blade 12. This flow of current to the windings of the motor produces operation of the latter at relatively high speed due to the inclusion of resistor 28 in series connection with the field windings 4 and 5. It will be noted that the circuit just traced is independent of the contact sets 21—26, 22—24 and 23—25, therefore the periodic interruption of the latter two sets of contacts for a brief instant once each revolution of the motor-driven cam 20 will not have any effect upon the continued flow of current to the motor windings. As a result the wiper blades move across the windshield glass (in opposite directions alternately as determined by the motion translating connections conforming to the usual pattern and interposed in conventional manner between the motor and blade operating shafts) at a relatively high speed in this Figure 1 position of switch blades 11 and 12.

Should operation of the blades at a lower speed be desired, the switch blades 11 and 12 are moved (in unison) to the respective positions indicated in Figure 2; and as this actually involves an electrical shift of the switch blade 12 only—the switch contact 13 being of sufficient arcuate extent to maintain electrical registry with the blade 11 in both the Figure 1 and 2 positions—there is no actual change in the current flow to the several motor windings previously described, the only difference being that the resistor 28 is no longer included in the circuit. The elimination of this resistance from the field circuit produces a weakenng of the armature current and the speed of rotation of the latter is accordingly lowered; the amount of speed decrease depending upon the value chosen for the resistor 28.

When it is desired to discontinue operation of the wiper blades the manual control switch is thrown to the Figure 3 position wherein switch blade 11 is in registry with the contact 14 rather than the contact 13 and the switch blade 12 registers with the contact 16 rather than the contact 17. Movement of the blade 11 to this new position establishes a new electrical path to the motor windings by way of conductors 61 and 62, contacts 24 and 22, and conductors 41 and 32, therefore there will be a flow of current to maintain the motor fully energized until the continued rotation of the motor carries the cam 20 to the switch operating relationship illustrated in Figure 5, in which position contact 22 is separated from contact 24 and all flow of current to the armature winding 6 ceases, but the armature "coasts" to a further position wherein cam 20 opens switches 23—25 and closes switch 21—26, as illustrated in Figures 3 and 6. Closure of switch 21—26 re-establishes current flow to the motor by way of conductors 66 and 67, leading to junction point 43, where the current then passes through field winding 4 before entering the armature; the field winding 5 being now inactive, due to the absence of any ground connection for terminal 29 in this Figure 3 position of switch blade 12. The resulting reversal of direction of flow through the field winding 4, plus the fact that the entire active portion of the field is now in series relationship to the armature rather than in shunt, produces a reverse magnetic effect of the right capacity to positively and substantially instantaneously nullify the forward momentum of the armature and substitute therefore a reversely directed motion; but before this reverse rotation proceeds very far the high part of cam 20 will have moved back a sufficient distance away from the follower 19 to produce a reopening of the switch contacts 21—26 (see Figure 5) and flow of current to the motor will cease at that instant. By properly positioning the cam 20 with respect, first, to the cam follower 19, and secondly, to the position of the wiper operating shafts, the latter will automatically come to a stop with the wiper blades in the desired position of registry with the parking edge of the associated windshield panels; the motor armature being positively halted in this exact position by the automatic action of the switch mechanism, first, in reversing the current flow to the field winding 4, and secondly, in breaking the current flow circuit immediately following such reversal, as above described.

During the brief "coasting" period of the armature, above referred to, there is a dynamic braking effect due to the fact that, although the contacts 22 and 24 have been separated, the contacts 23—25 have not yet been separated, therefore for the brief period elapsing while the armature is moving the cam 20 from the Figure 5 to the Figure 6 position the energy remaining in the armature windings is drained off to ground by way of said contacts 23—25; and as this draining off is in a direction opposite to the normal direction of current flow, the result is to decelerate, or "dynamically brake" the armature. This braking effect (coming as it does just in advance of the actual reversing of the motor by closure of contacts 21—26) is an important factor in facilitating the prompt reversal and ultimate complete stoppage of armature travel, with the wiper blades in correct "parked" position.

We claim:

1. In a windshield wiper mechanism, a wiper-connected member adapted and arranged normally to be driven to and from a predetermined position corresponding to a parking position of the wiper through repeating cycles during performance of successive wiper operations, a reversible electric motor having armature and field windings, an armature carrying said armature windings, said armature being drivably connected to said member, a source of current, manual switch means having at least one "on" position and an "off" position, automatic switch means including a pair of reciprocating contact elements movable to circuit-making and breaking positions successively during each of said cycles, means responsive to shifting said manual switch means to "on" position to cause current to flow from said source to said armature and field windings, independently of said reciprocating contact elements, means responsive to shifting said manual switch means to "off" position to maintain current flow from said source to said armature and field windings, but by way of one of said reciprocating contact elements, and only until the next succeeding circuit-breaking movement thereof, and means responsive to the next succeeding circuit-making movement of the second of said pair of reciprocating contact elements to establish current flow from said source to a portion of said field windings in a direction opposite to that normally prevailing, and thence to said armature winding in series fashion, to thereby create a reverse torque effect sufficient to produce an actual reversal of the direction of rotation of said motor, which reverse rotation quickly returns said second reciprocating contact element to circuit-breaking position and thereby produces a complete cessation of current flow to said motor.

2. Mechanism as defined in claim 1, wherein said manual switch means includes a pair of movable switch blades of opposite polarity, and a plurality of stationary contact points, and wherein said current flow causing means includes a corresponding plurality of conductors connecting said motor windings and reciprocating contact elements with said stationary contact points; one of said switch blades having connection with said current source and the other with ground.

3. Mechanism as defined in claim 1, wherein said automatic switch means includes a third reciprocating contact element operating to drain off, to ground, any energy remaining in the armature winding after movement of said first reciprocating contact element to circuit-breaking position, following movement of said manual switch means to said "off" position.

EDWARD LATTA.
ADOLPH J. WOLTANSKI.

REFERENCES CITED

The following references are of record in the file of this patent:

UNITED STATES PATENTS

| Number | Name | Date |
|---|---|---|
| 2,364,603 | Coxon et al. | Dec. 12, 1944 |
| 2,449,223 | Hayman | Sept. 14, 1948 |
| 2,507,918 | Mageoch | May 16, 1950 |
| 2,528,181 | Sacchini | Oct. 31, 1950 |